March 31, 1959 J. M. WEST 2,880,146
APPARATUS FOR EVAPORATING FLUIDS
Filed Oct. 16, 1953 2 Sheets-Sheet 2

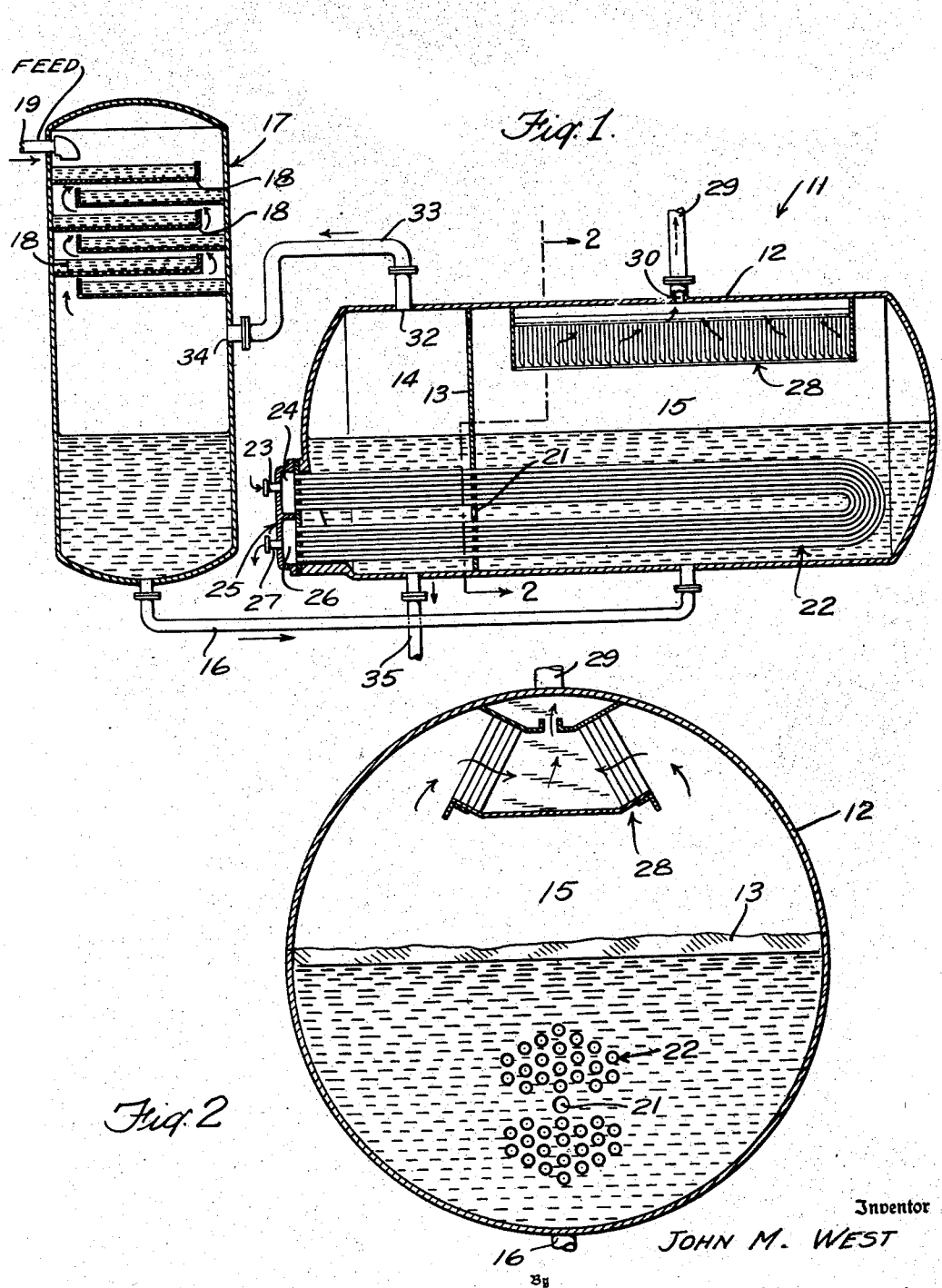

Inventor
JOHN M. WEST
By C. R. Miranda
Attorney

United States Patent Office 2,880,146
Patented Mar. 31, 1959

2,880,146

APPARATUS FOR EVAPORATING FLUIDS

John M. West, Pelham, N.Y., assignor to Foster Wheeler Corporation, New York, N.Y., a corporation of New York Application October 16, 1953, Serial No. 386,587

8 Claims. (Cl. 202—180)

This invention relates to purifying apparatus and more particularly to apparatus for removing impurities from a fluid by evaporating a pure product from an impure fluid.

Evaporators are utilized for supplying a substantially pure vapor which, when condensed to a fluid as for example water, may be used as make-up water for steam boilers or for use in process plants where pure water is required. Where salt water or raw water from a river, lake or other source is evaporated, the water in the evaporator is blown down at intervals to decrease the solid concentration i.e. impurities, in the water. The blowdown water is discharged to waste or in most cases, is used to heat the incoming feed water. In either case, undue loss of heat occurs and an even greater amount is lost when the quantity of blow-down is increased to provide for greater reductions in solid concentration.

The present invention provides novel methods and apparatus for removing impurities from a fluid and contemplates as one of its objects a substantial reduction of solid concentration in a fluid over that of the usual evaporator without increasing the quantity of blow-down. The fluid in the evaporator is boiled to provide a vapor which is dried and then passed to a heat exchanger, such as a feed water heater or a condenser. A portion of the fluid in the evaporator is fed to a second evaporator where the fluid again is heated to provide a second vapor, and some of the fluid in the second evaporator is blown down. The second vapor is passed in direct contact with the fluid supplied to the first evaporator to cause condensation of the vapor and admixture of the condensate with the fluid. The amount of fluid supplied to the first evaporator is sufficient to both maintain a predetermined level in both evaporators and to replenish the quanity of fluid evaporated and blown down.

The invention will be understood from the following description when considered in connection with the accompanying drawings wherein two embodiments of the invention are illustrated.

In the drawings wherein like reference characters refer to like parts throughout the several views:

Fig. 1 is a sectional view, in elevation, of the novel evaporating apparatus of the present invention;

Fig. 2 is an enlarged section taken along line 2—2 of Fig. 1;

Figure 3:
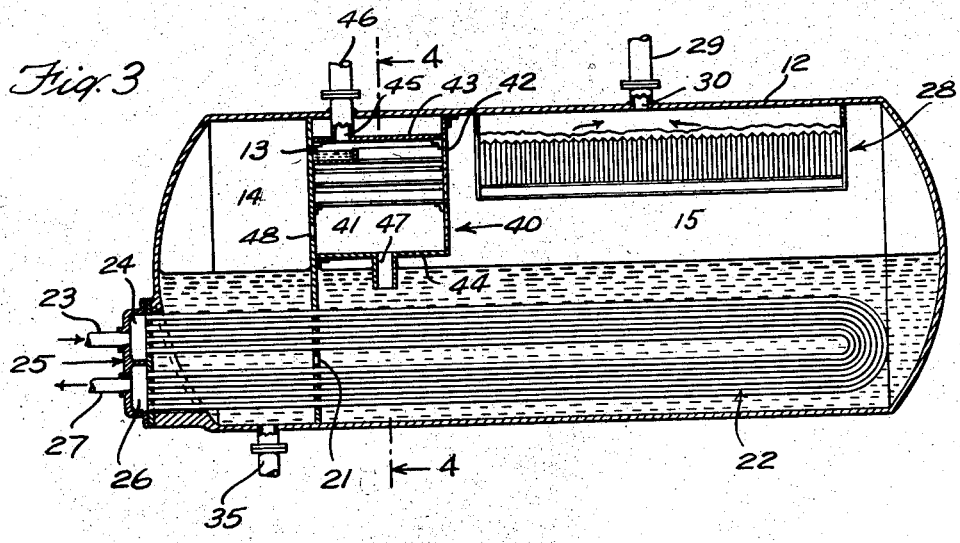
Fig. 3 is a sectional view, in elevation, of a second embodiment of the present invention and wherein the preheater vessel is disposed in the evaporator.

Referring now to the drawings for a more detailed description of the present invention, and more particularly to Fig. 1 wherein one embodiment thereof is clearly illustrated, the reference numeral 11 designates an evaporator which comprises a closed drum or shell 12. A wall 13 extends transversely of shell 12 and divides the latter into two chambers or evaporating sections 14 and 15. A conduit 16 communicates with chamber 15 and with a fluid outlet port of a vertically arranged preheater vessel 17. A plurality of horizontally arranged restricting baffles 18 are disposed in vessel 17 immediately below a fluid inlet port which accommodates a conduit 19 connected to a source (not shown) of feed fluid, as for example feed water. The feed water enters the vessel 17 through the inlet port, flows downwardly over the baffles and collects in the bottom of the vessel. The feed water from preheater vessel 17 flows to chamber 15 through conduit 16 by gravity. An orifice or opening 21 is provided in wall 13 and communicates chambers 14 and 15 to effect passage of the water from chamber 15 to chamber 14. The water level in vessel 17 and shell 12 is almost the same except for a static head which is required to maintain the flow through the interconnecting piping.

A substantially U-shaped tube bundle 22 is arranged in the lower portion of drum 12 and extends from chamber 14 into chamber 15. The tube bundle 22 is supplied with a heating fluid as for example steam, through a conduit 23 outside the drum, the conduit communicating with an inlet chamber 24 of a steam chest 25 arranged on the end of drum 12 adjacent chamber 14. The steam passes through the tube bundle in heat exchange relationship with the feed water in drum 12 to cause boiling of the water and leaves the tube bundle, passes through an outlet chamber 26 of steam chest 25, and thence to an outlet conduit 27.

The vapor produced by the boiling water in chamber 15 passes through a moisture separator 28 and is withdrawn from the chamber by way of an outlet conduit 29 connected to a vapor outlet port 30. Separator 28 removes entrained particles of water containing impurities to effect a drying and purification of the vapor leaving chamber 15.

The passage of steam through tube bundle 22 also causes boiling of the water in chamber 14 whereby a vapor is produced. A vapor outlet port 32 is formed in the upper wall of chamber 14 to provide for withdrawal of vapor from the chamber. A conduit 33 communicates with vapor outlet port 32 and with a vapor inlet port 34 in preheater vessel 17 to deliver the vapor from chamber 14 to the vessel. Vapor inlet port 34 is arranged immediately below the restricting baffles 18 to cause commingling of the entering and upwardly flowing vapor with the downwardly flowing water. The vapor in passing in direct contact with the water totally condenses and collects in admixture with the feed water at the bottom of preheater vessel 17. By reason of the foregoing, the water in vessel 17 is heated to approximately saturation temperature whereby the water is delivered to the evaporator shell 12 at substantially saturation temperature. A conduit 35 communicates with an opening in the bottom of chamber 14 of shell 12 to provide for continuous blowdown of water from the chamber.

In operation, the water enters preheater vessel 17 through conduit 19, flows downwardly over the baffles 18 and in intimate contact with the vapor from chamber 14. The vapor gives up its heat to the water and is thereby condensed, the condensate and water collecting at the bottom of vessel 17 and being delivered to chamber 15 by way of conduit 16. A float operated valve (not shown) is operated in response to the level of the water in vessel 17 or shell 12 to throttle the flow of water through conduit 19 to maintain a predeterminad water level at all times in chambers 14 and 15 and vessel 17. Part of the water in chamber 15 is vaporized and the resulting vapor is withdrawn from the chamber through outlet conduit 29 as a substantially pure vapor. The vapor may be utilized as such, or may be condensed for use as make-up water, or for use as pure water for process plants.

Wall 13 maintains chambers 14 and 15 in vapor tight relationship but orifice 21 provides for the passage of water from chamber 15 to chamber 14. The quantity of water which passes through orifice 21 is substantially equal to the water used in producing the vapor in chamber 14 plus the water blown down from the chamber, while the quantity of water delivered to chamber 15 is equal to the water used in producing the vapor in chamber 15 plus the water passing through the orifice 21, whereby a predetermined water level is maintained in the chambers. Since the purity of the vapor withdrawn from chamber 15 is a function of the solid concentration in the water in said chamber, the purity of water is increased when water is passed from chamber 15 into chamber 14; it being understood that the solid concentration value depends upon the ratio of water delivered to the chamber and the water removed from the chamber.

The quantity of water blown down from chamber 14 is substantially equal to the quantity of water blowndown in the usual evaporator having a single evaporating section, assuming that the latter and the evaporator of the present invention both are operated to produce the same quantity of vapor. With the present invention, not all of the water discharged from chamber 15 is blown down but rather a portion of the water is evaporated to preheat incoming feed water whereby more heat conservation is provided. Furthermore, since the vapor from chamber 14 has less solid concentration than the water entering preheater vessel, the mixture of feed water and condensed vapor provides less of a solid concentration in the feed water being delivered to chamber 15 than the raw water entering preheater vessel 17.

To further illustrate the operation and advantages of the present invention, the operation of a conventional evaporator having a single evaporating chamber or section and the evaporator of the present invention should be considered; both evaporators producing 30,000 lbs. of vapor per hour. Let it be assumed that the incoming raw water is at 60° F., contains 250 parts per million (p.p.m.) of impurities, the operating pressure is as 40 p.s.i.a. with the corresponding saturation temperature of 276.3° F., and that blowdown is 10% of the net vapor produced, i.e. 3,000 lbs. per hour.

In evaporators having a single evaporating chamber or section, after equilibrium is established, the concentration in the shell is 33,000/3,000×250 which is equal to 2,750 p.p.m.

With the evaporator of the present invention, the quantity of water leaving the preheater vessel is 40,350 lbs. per hour which quantity includes 7,350 lbs. per hour of vapor required to heat the feed water in preheater vessel 17. Assuming the vapor entering the preheater vessel 17 contains 50 p.p.m., then the resultant solid concentration of water leaving the vessel is 7,350/40,350×50 plus 33,000/40,350×250 which equals 213.5 p.p.m.

The flow of water from chamber 15 to chamber 14 through orifice 21 is 3,000 plus 7,350 which is equal to 10,350 lbs. per hour. Therefore, the solid concentration of the water in chamber 15 is 40,350/10,350×213.5 p.p.m. or 832 p.p.m. The solid concentration of the water in chamber 14 is the same as in the conventional evaporator, i.e. 2,750 p.p.m.

From the foregoing, it may be seen that the solid concentration of the water in chamber 15 has been reduced from 2,750 p.p.m. to 832 p.p.m., a reduction to approximately 30%, without increasing the amount of blowdown.

Figure 4:
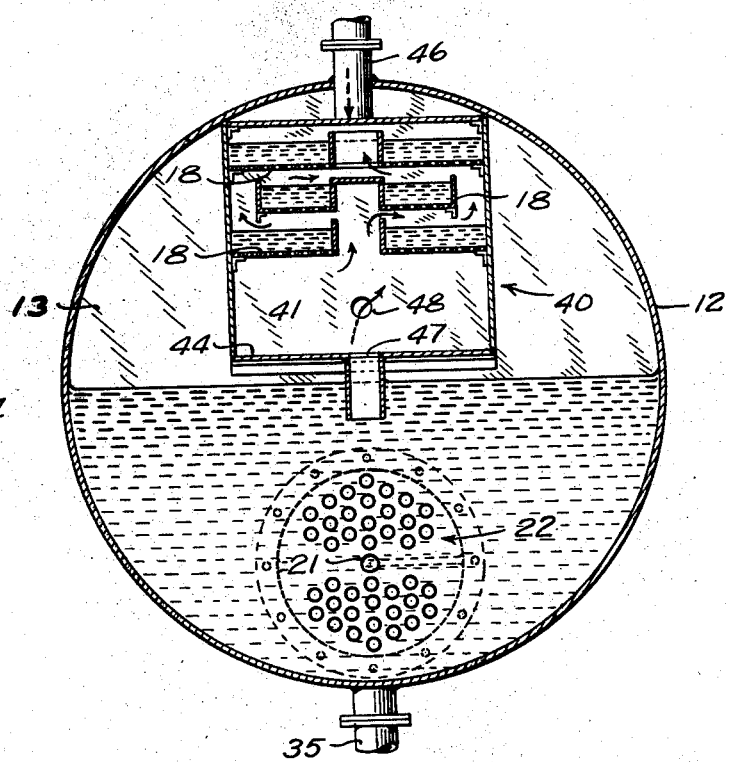
Fig. 4 is an enlarged sectional view taken along line 4—4 of Fig. 3.

A second embodiment of the present invention is illustrated in Figs. 3 and 4 and differs from the first embodiment in that the preheater vessel is arranged within the drum 12. The preheater vessel is designated in Figs. 3 and 4 by the reference numeral 40 and comprises a chamber 41 defined by a portion of wall 13, parallel side wall 42 and top and floor plates 43 and 44, respectively. Top plate 43 has a fluid inlet port or opening 45 which accommodates an end of a feed water conduit 46 connected to a source (not shown) of feed water. A fluid outlet port 47 is formed in the floor plate 44 and serves to discharge the feed water from the preheater vessel 40. A second opening or vapor inlet port 48 is provided in wall 13, above the water level of the water chamber 14, and provides for the entry of vapor from chamber 14 into the preheater vessel.

The operation of the second embodiment is the same as that of the first embodiment, the only difference between the embodiments is the location of the preheater vessel with respect to the shell 12. By arranging the preheater vessel in the shell 12 instead of outside the shell, a more compact arrangement is provided.

It will now be apparent that the present invention provides a novel apparatus for producing a pure vapor. By providing an evaporator having two evaporating sections wherein one of the sections discharges feed water to the second section where blow-down is provided, and the vapor from the second section is utilized in heating and decreasing the solid concentration in the incoming feed water, a pure vapor is obtained from the one evaporator section.

Although two embodiments of the present invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. Apparatus for producing a pure vapor, comprising a first evaporator supplied with a liquid, a second evaporator, means communicating with both said evaporators for delivering predetermined amounts of liquid from said first evaporator to said second evaporator, means for indirectly heating the liquid in said first and second evaporators to produce vapor in each of said evaporators, means for withdrawing from the first evaporator all of the vapor generated therein for use, blow-down means in said second evaporator for discharging liquid therefrom, and means for passing vapor generated in said second evaporator in direct heat exchange relationship with the liquid supplied to the first evaporator to preheat said liquid.

2. The apparatus of claim 1 wherein a separator is associated with said first evaporator for removing the moisture from the first-mentioned vapor before the latter is withdrawn from said evaporator.

3. Apparatus for producing pure vapor, comprising a preheater vessel having liquid inlet and outlet ports, means communication with a source of liquid and said liquid inlet port to supply said preheater vessel with liquid, an evaporator, conduit means connected to the liquid outlet port of said preheater vessel for conducting the liquid to said evaporator, a second evaporator, means communicating with both said first and second evaporators for delivering predetermined amounts of liquid from said first evaporator to said second evaporator, means for indirectly heating the liquid in said first and second evaporators to produce a vapor in each of said evaporators, an outlet port for withdrawing all of the vapor generated in the first evaporator from said evaporator for use, blow-down means for discharging a portion of the liquid from said second evaporator, an outlet port in said second evaporator for withdrawing vapor from said second evaporator, and means communicating said last-mentioned outlet port with said preheater vessel to cause said vapor generated in said second evaporator to pass in direct heat exchange relationship with the liquid in said preheater vessel to thereby provide for condensation of the vapor and admixture thereof with the liquid conducted to said first evaporator.

4. The apparatus of claim 3 wherein said preheater vessel comprises a vertically arranged shell having baffles disposed therein, and the liquid flows downwardly over the baffles countercurrent to and in contact with the vapor from said second evaporator which flows upwardly in the shell.

5. Apparatus for producing a pure vapor, comprising a preheater vessel having liquid inlet and outlet ports and a vapor inlet port, means communicating with a source of fluid and with said liquid inlet port to supply said preheater vessel with liquid, an evaporator comprising a shell having a pair of evaporating sections, conduit means communicating with liquid outlet port of said preheater vessel and with one of said evaporating sections to conduct liquid thereto, means communicating with both of said evaporating sections for delivering predetermined amounts of liquid from said one evaporating section to the other of said pair of evaporating sections, means for indirectly heating the liquid in both of said evaporating sections to produce vapor in each of the sections, a separator associated with said one evaporating section for removing moisture from said vapor produced in said one evaporating section, a discharge port in said shell for withdrawing the vapor after the moisture is separated therefrom, blow-down means for said other evaporating section for discharging liquid therefrom, an outlet port in said other evaporating section for withdrawing vapor generated therein, and conduit means communicating the last-mentioned outlet port with the vapor inlet of the preheater vessel to provide for direct heat exchange relationship of the vapor withdrawn from said other evaporating section with said liquid in the vessel to thereby cause condensation of said vapor and preheating of the liquid delivered to said one evaporating section.

6. The apparatus of claim 5 wherein a wall separates the shell of the evaporator into a vapor-tight chamber for each evaporating section, the wall having an opening providing for passing of liquid only, from one chamber to the other.

7. In apparatus for producing a pure vapor, an evaporator comprising a shell having two evaporating sections, a preheater vessel arranged in said shell and connected to a source of liquid for receiving liquid, means for conducting the liquid from said preheater vessel to one of said evaporating sections, means communicating both said evaporating sections for delivering predetermined amounts of liquid from said one evaporating section to the other of said evaporating sections, means for indirectly heating the liquid in both of said evaporating sections to produce a vapor in each of the evaporating sections, a separator associated with said one evaporating section for removing moisture from said vapor produced therein, a discharge port in said shell for withdrawing the vapor produced in said one evaporator after moisture is removed therefrom, blow-down means for said other evaporating section for discharging liquid therefrom, means communicating said other evaporating section with said preheater vessel for introducing the vapor generated in said other evaporating section into the preheater to provide for direct heat exchange of said vapor with the liquid in said vessel, to thereby cause condensation of the vapor and preheating of the liquid delivered to said one evaporating section.

8. The apparatus of claim 7 wherein the preheater vessel is arranged in said one evaporating section, and a wall separates the shell of the evaporator into a chamber for each evaporating section, said wall having a first opening providing for passage of said second vapor from said other evaporating section to said preheater vessel and having a second opening providing for passage of liquid from said one evaporating section to said other evaporating section.

References Cited in the file of this patent

UNITED STATES PATENTS

| Number | Name | Date |
|---|---|---|
| 72,241 | Tice | Dec. 17, 1867 |
| 838,195 | Le Sueur | Dec. 11, 1906 |
| 1,200,996 | Soderlund et al. | Oct. 10, 1916 |
| 1,378,637 | Wall | May 17, 1921 |
| 1,771,385 | Subkow | July 22, 1930 |
| 1,827,846 | Holmquist | Oct. 20, 1931 |
| 2,010,929 | Reich | Aug. 13, 1935 |
| 2,398,396 | Powell | Apr. 16, 1946 |

UNITED STATES PATENT OFFICE

CERTIFICATE OF CORRECTION

Patent No. 2,880,146                                                  March 31, 1959

John M. West

It is hereby certified that error appears in the printed specification of the above numbered patent requiring correction and that the said Letters Patent should read as corrected below.

Column 1, line 32, strike out "methods and"; lines 44 and 45, for "conensation" read -- condensation --; column 2, line 29, after "boiling" insert -- of --; line 66, for "predeterminad" read -- predetermined --; column 3, line 46, for "In evaporators" read -- In the evaporators --; line 56, for "of water" read -- of the water --; column 4, line 54, for "communication" read -- communicating --; column 5, line 12, after "with" insert -- the --.

Signed and sealed this 29th day of December 1959.

(SEAL)
Attest:

KARL H. AXLINE                                               ROBERT C. WATSON
Attesting Officer                                          Commissioner of Patents